United States Patent [19]
Liedtke

[11] Patent Number: 5,913,222
[45] Date of Patent: Jun. 15, 1999

[54] COLOR CORRECTION METHOD IN A VIRTUALLY ADDRESSED AND PHYSICALLY INDEXED CACHE MEMORY IN THE EVENT OF NO CACHE HIT

[75] Inventor: Jochen Liedtke, Sankt Augustin, Germany

[73] Assignee: GMD-Forschungszentrum Informationstechnik GmbH, Germany

[21] Appl. No.: 08/727,660

[22] PCT Filed: Apr. 12, 1995

[86] PCT No.: PCT/EP95/01378

§ 371 Date: Feb. 3, 1997

§ 102(e) Date: Feb. 3, 1997

[87] PCT Pub. No.: WO95/28678

PCT Pub. Date: Oct. 26, 1995

[30] Foreign Application Priority Data

Apr. 15, 1994 [DE] Germany .............................. P4412929
Apr. 5, 1995 [DE] Germany ............................. P19512745

[51] Int. Cl.[6] ..................................................... G06F 12/08
[52] U.S. Cl. ............................... 711/3; 711/210; 711/203; 711/206; 711/207
[58] Field of Search ..................................... 711/210, 203, 711/206, 207, 3

[56] References Cited

U.S. PATENT DOCUMENTS

| 4,400,774 | 8/1983 | Toy ............................................. 711/3 |
| 5,226,133 | 7/1993 | Taylor et al. ............................ 711/207 |
| 5,584,002 | 12/1996 | Emma et al. ............................... 711/3 |
| 5,668,968 | 9/1997 | Wu .............................................. 711/3 |

FOREIGN PATENT DOCUMENTS

WO 88/09014  11/1988  WIPO .

*Primary Examiner*—Tod R. Swann
*Assistant Examiner*—Felix B. Lee
*Attorney, Agent, or Firm*—Akin, Gump, Strauss, Hauer & Feld, LLP

[57] ABSTRACT

In a virtually addressed and physically indexed cache memory, the allocation of a color of a cache entry can be changed for a color allocation of the virtual and physical pages by assigning a color information to each cache entry, by which a second cache address operation is executed after an unsuccessful first cache address operation. Should there still be no cache hit, another cache addressing is attempted by means of a color correction, i.e. an indexing of the cache memory using, among others, the physical color. Should this cache address operation also fail to produce a cache hit, there is a cache miss.

4 Claims, 7 Drawing Sheets

COLOR CORRECTION METHOD IN A VIRTUALLY ADDRESSED AND PHYSICALLY INDEXED CACHE MEMORY IN THE EVENT OF NO CACHE HIT

RELATED CASES

This application claims priority from application number PCT/EP95/01378 as required by MPEP 201.

FIELD OF THE INVENTION

The invention refers to a cache memory device with a cache memory that is indexed virtually, the cache entries thereof being tagged with physical (real) addresses.

BACKGROUND OF THE INVENTION

Modern processors require cache memories in order to bridge the gap between fast processors and slow main memories.

Physically and virtually indexed caches are known. In a physically indexed cache (FIG. 7), the virtual address supplied by the processor is first translated into a physical address by the Translation Lookaside Buffer (TLB). Then, the cache is addressed using this physical address.

In a virtually indexed cache (FIG. 8), the cache is directly addressed by the virtual address. A translation into the corresponding physical address only takes place in the case of a cache miss. The advantage of a virtually-indexed cache lies in the higher speed, since the translation step by the TLB is omitted. Its disadvantage shows when it comes to synonyms or aliasing.

Direct-mapped caches use a map function (as shown in FIGS. 7 and 8) to calculate a cache index from the physical address or the virtual address a and to select a line of the cache therewith. Then, a is compared to the address of the memory area (the tag of the cache entry) presently associated with this cache line. In the case of identity, there is a hit (and the cache line is used instead of the main memory), otherwise there is a miss. Mostly, (a mod cache size)/line size is used as the map function. To this end, not the complete virtual address must be stored in the cache, but a/cache size will be sufficient.

Direct-mapped caches are simpler but cause higher miss rates than n-way caches. Basically, these consist of n correspondingly smaller direct-mapped cache blocks. It is made sure that each main memory element is located in one block at most. Since the map function indicates n cache lines, the cache can contain up to n elements with map equivalent addresses. This n-fold associativity reduces the probability of clashes and increases the hit rate accordingly.

The cache type preferred at present is a virtually-indexed and real (physically) tagged cache. It is just as fast as a virtually-indexed and virtually-tagged cache, yet it avoids most of the disadvantages thereof, in particular the problems with multi-processor systems, synonyms, sharing and coherence.

It is true that a physically indexed cache is free from these disadvantages as well, but it requires a complete address translation step (virtual→real) by the TLB before the cache access can be initiated. On the other hand, a virtually-indexed and physically tagged cache allows for parallel TLB and cache accesses (see FIG. 9). Therefore, the instruction pipeline of the processor is shorter so that the idle time of an instruction, as a rule, decreases by one clock with the processor performance increasing accordingly.

The mechanism remains simple as long as all of the address bits (i) necessary for indexing the cache are located within the range of the address offset (address within a page). Since this address portion is not changed by the translation of the virtual address into the physical address, the cache can be addressed (indexed) thereby even before the translation step of the TLB. Only at the end of the cache access and the parallel TLB translation step is it checked, whether the physical address (the tag) associated with the cache entry is identical with the physical address supplied by the TLB. In doing so, only the most significant bits of the address that are contiguous with the index portion (i) have to be compared, since the cache entry indexed by (i) can only be associated with addresses the index bits of which have the value (i). Accordingly, only the most significant bits have to be stored in the cache as the tag (physical address).

An n-way set-associative cache of this type may only be up to $n \times 2^P$ in size, where $2^P$ is the page size. The cache size may be increased by larger pages or increased associativity.

However, an interesting technique is page coloring. This refers to the method wherein the set-up of pages in the real memory is always such that the least significant address bits of the virtual and the physical page address are identical (see FIG. 10). Here, the virtual page number (vpn) and the cache index (i) will overlap. The overlapping portion is shown in black in FIG. 10. The corresponding part of the virtual address is called virtual color c, the part of the physical address is referred to as physical color c'. In the case of a well-colored allocation, i.e. when the virtual and physical colors match, the above mentioned limitation of the size $n \times 2^P$ is void.

If, as shown in FIG. 11, there is an additional comparison of the virtual and physical colors, the tagging (physical address) may be done without storing the corresponding color bits and only the most significant bits (r') of the physical page number have to be compared to the tag.

It is the object of the present invention to provide a cache memory device with a virtually indexed and physically tagged cache memory which allows a fast cache access even in the case of badly-colored pages. Synonyms should be admissible without alignment restrictions, however, only the access via one address (main address) has to be fast. Any access via other addresses (synonyms) can be delayed; however, it is to be secured that each of the synonymous addresses can be selected as main address, in particular the virtual color of the main address should be able to differ from the physical color.

SUMMARY OF THE INVENTION

The object is solved with a cache memory device having the features mentioned in claim 1, the features of advantageous embodiments of this cache memory device being stated in the respective dependent claims.

As already explained above, in the so-called page coloring, the virtual address space is subdivided into different groups of pages (called "colors"), the allocation of virtual pages to physical pages being well-colored as a rule. In other words: a red virtual page is mapped onto a red physical page. In the same way that the virtual color is contained in the virtual address, the physical color is contained in the physical address. The present cache memory device solves the problem of mapping a virtual address belonging to a virtual page with a first color onto a cache entry belonging to a physical page with a color different from the first color.

1) When a cache addressing occurs in the present cache memory device, the same is first indexed by the cache index portion of the virtual address and the group information thereof (virtual color), which is part of the page number address portion representing the virtual page number, whereby one cache entry is addressed per way (the cache memory may either be one- or multi-way set associative). Per addressed cache entry, the tag is checked for congruence with the residual physical address portion of the physical page number of the physical address that has been translated from the virtual address (e.g., by means of a TLB). Thus, there exists one tag comparator per way of the cache memory. However, there also exists a group information comparator per way of the cache memory, which compares the group information of the physical address (physical color) with the group information of the cache entry addressed per way. Further, each cache entry has a state flag. When the state flag is set, the cache entry is a main entry, whereas, when the state flag is not set, the group information of this cache entry indicates a main entry. When, for an addressed cache entry, the tag is identical with the residual physical address and the group information is identical with the group information of the physical page number of the page address and the state flag is set, too, there is a cache hit, whereby the cache addressing is terminated and data may be written into or read from the data field of the respective cache entry specified by the tag. In this case, one has come across a main entry.

2) If, however, for one of the addressed cache entries, the tag corresponds to the residual physical address portion, but the state flag is not set, and if it is further true that the virtual group information (group information of the virtual address) equals the physical group information (group information of the physical address), a well-colored access to a reference entry of the cache memory has been made, the group information of this reference entry indicating the main entry. In order to get to this main entry of the cache memory, the cache memory is indexed again by means of the cache index portion of the virtual address and the group information of the reference entry. Certain bit positions may be provided per cache entry for storing the group information; alternatively, it is also possible to store the group information in the data field itself, since this data field is not needed for writing or reading when the corresponding cache entry is a reference entry. After this new cache indexing, the addressed cache entries are again checked for correspondence to the residual physical address portion and for correspondence of the physical group information to the group information of the addressed cache entries. In any case, there is one among the addressed cache entries that has a set state flag and a tag corresponding to the residual physical address portion, as well as group information corresponding to the physical group information. Thus, a cache hit is given.

3) If no cache hit has occurred and if the virtual group information differs from the physical group information, a "color correction" is tried, wherein the cache memory indicates using the cache indexing portion of the virtual address and the group information of the physical address (physical color) and checks the cache entries thus addressed for correspondence of their tags to the residual physical address portion and for correspondence of their group information to the group information of the physical address. The subsequent operation follows the above described mechanism (see above from 1), including 2), if applicable). Should this cache access not lead to a cache hit, the addressing is canceled as such and a cache miss is signaled.

Using the present cache memory device, the cache memory can be adapted dynamically as far as the coloration of the virtual and the physical pages or the color allocation are concerned. Due to this dynamic adaptation, different cache entries of a common physical page may be addressed quickly with different "colors" (group information), always using a single color that can be selected freely and, in particular, is adaptable.

BRIEF DESCRIPTION OF THE DRAWINGS

The following is a detailed description of an embodiment of the invention by means of Figures. The Figures show.

BRIEF DETAILED DESCRIPTION OF THE PREFERRED EMBODIMENTS

The following terms are valid in the subsequent description (also see in the Figures):

v virtual address vpn virtual page number c virtual color rpn physical (real) page number $\dot{c}$ physical color $\dot{r}$ high-order part of rpn (without $\dot{c}$)

$\ddot{c}$ index color $\ddot{r}$ low-order part of cache entry number

Each cache entry (line) contains a field $r_i$ and a field $c_i$ for the tag, a one-bit field $main_i$, a data field $d_i$, as well as further status fields which are not listed here.

A current cache line is selected by an index i, whose high-order bits are referred to as index color $\ddot{c}$. Virtual color, physical color and index color are of equal bit number.

In the cache, main entries and reference entries are distinguished. In the case of main entries (identified by $main_i$ set), $d_i$ contains the current data, $c_i$ the physical color and $r_i$ the high-order part of the data's physical address. Main entries are fast addressed via the virtual main address mentioned above. Reference entries (identified by $\overline{main_i}$), on the other hand, do not contain data but include a reference to the corresponding main entry in $c_i$, namely its index color. In the case of reference entries, $r_i$ also contains the high-order part of the physical address of the associated data.

Regardless of the above, well-colored and badly-colored entries are distinguished. In the case of a well-colored entry, index color and physical color are identical, in the case of a badly-colored entry they are not identical.

There are well-colored main entries, badly-colored main entries and well-colored reference entries. Badly-colored reference entries do not occur in this.

The following invariances hold:

1. If the cache contains a well-colored reference entry, it also contains the corresponding badly-colored main entry, namely at the position referred to.
2. For each badly-colored main entry, there is exactly one well-colored reference entry referring to it.

Referring to FIGS. 1 to 4, the following is a description of the addressing of a direct mapped cache.

Figure 1:
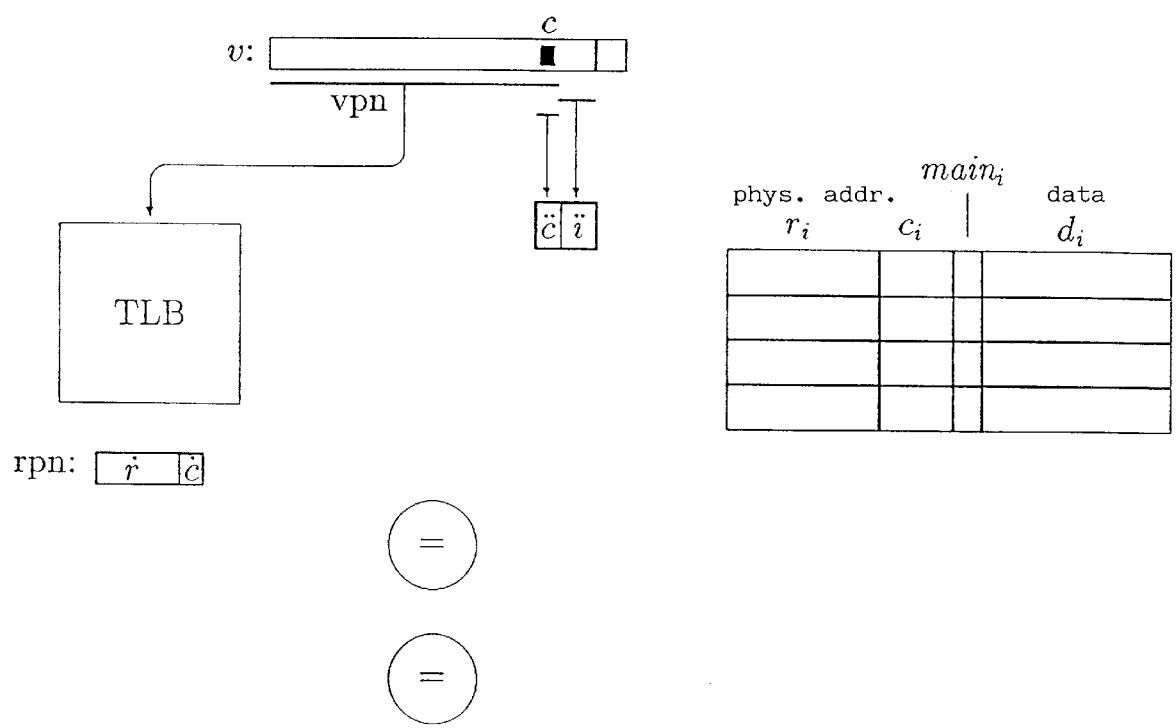
FIG. 1—the preparation step for a badly-colorable cache according to the present invention, FIG. 2—the step of accessing the badly-colorable cache, FIG. 3—the detour/index step of the badly-colorable cache, FIG. 4—the color correction step, FIG. 5—the general color correction step in a cache memory, FIG. 6—the access step and the color-corrected access step in a cache memory, FIG. 7—the structure of a physically indexed cache memory, FIG. 8—the structure of a virtually indexed and virtually tagged cache memory, FIG. 9—the structure of a virtually indexed and physically tagged cache memory, FIG. 10—the structure of a cache memory based on well-colored allocation, FIG. 11—the step of checking the well-coloration in the cache memory of FIG. 10.
Figure 2:
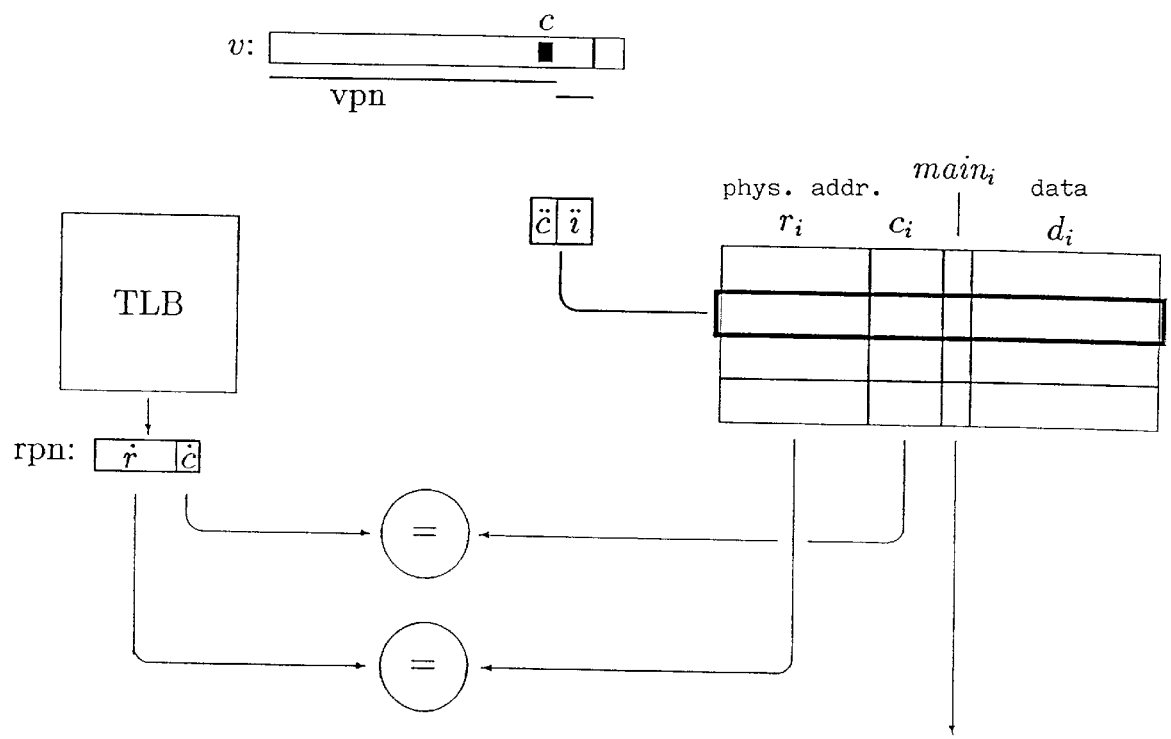
Figure 3:
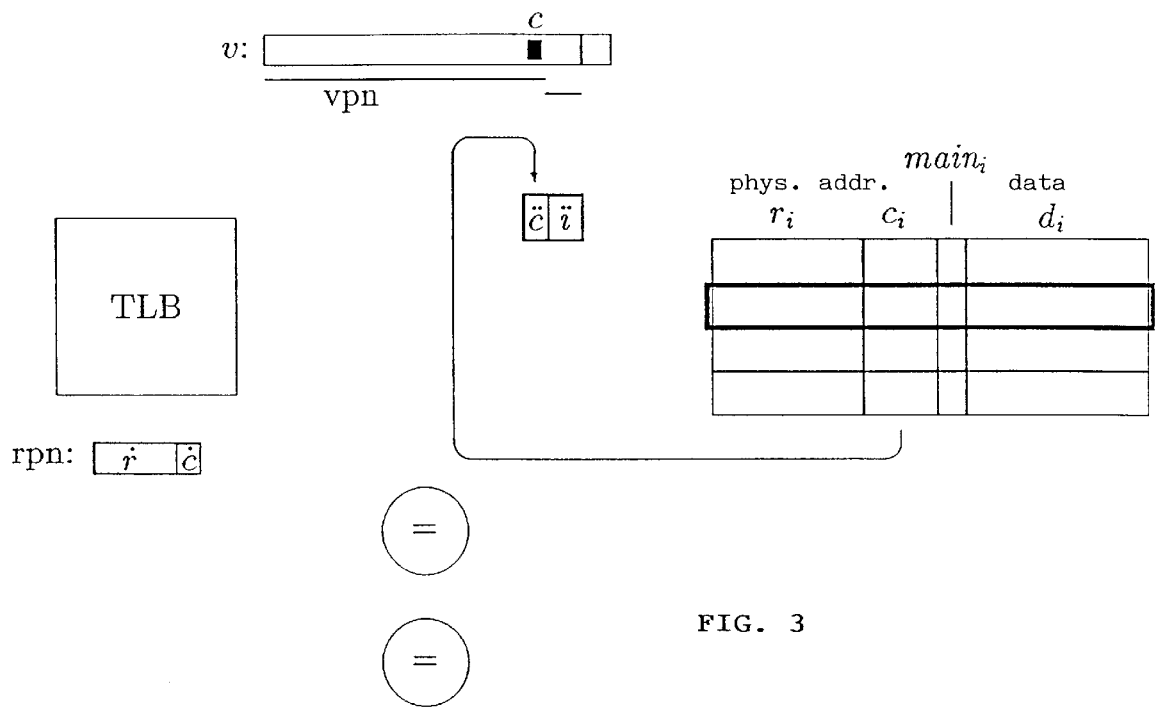
Figure 4:
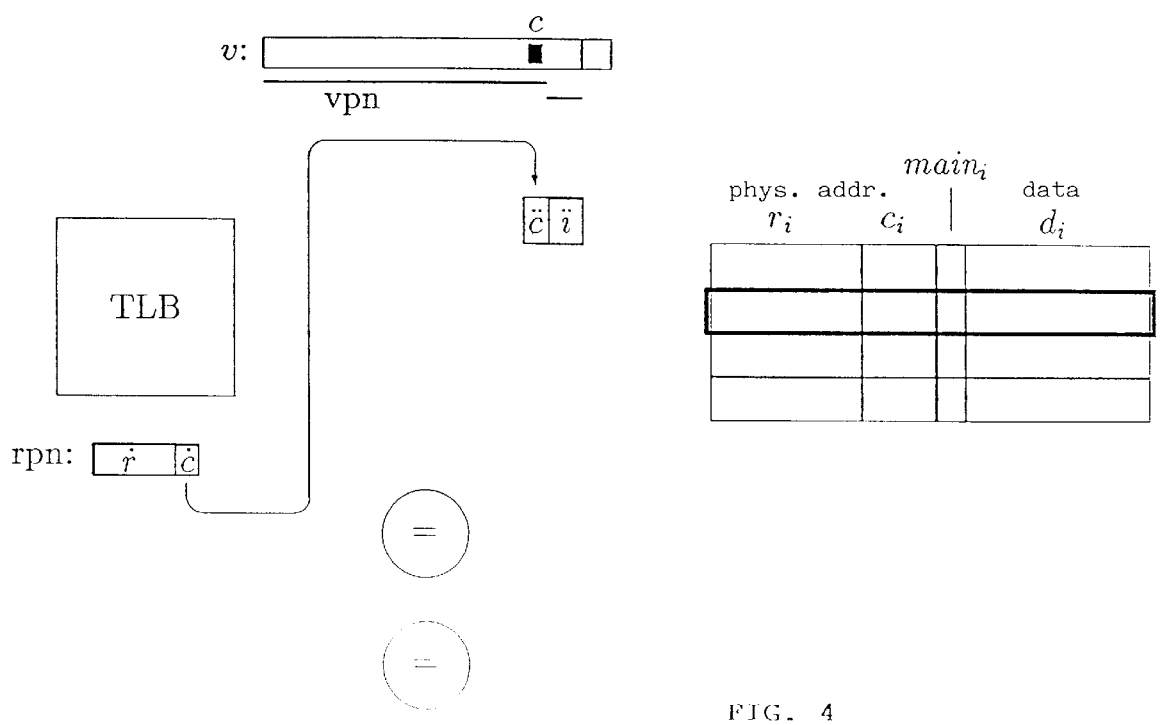

1. At the beginning of a cache access, the index port ($\ddot{c}$, $\ddot{r}$) is loaded from the virtual address (see FIG. 1). Simultaneously, the TLB starts an address translation with vpn as input.
2. The cache entry addressed by ($\ddot{c}$,$\ddot{r}$) is read out. $c_i$ is compared with $\ddot{c}$ and $r_i$ with $\ddot{r}$ (FIG. 2). If it is a main entry, i.e., if $main_i$ is set and if the two comparisons show equality, it is a cache hit, i.e., the data of the cache is delivered (read access) or the new data is written into the cache (write access). Then the cache access is terminated.
3. If a reference entry was read out in step 2, i.e., if $\overline{main_i}$ holds and if the high-order parts of the physical address match ($r_i=\dot{r}$) and if it is a well-colored access (index color=physical color, $\ddot{c}=\dot{c}$), $\ddot{c}$ is loaded with the read out $c_i$ (FIG. 3). Subsequently, another step 2 is executed (detour step). (Variant (a) or in case not only the reference index but also the reference way is stored in the data field—only with direct mapped cache—: No checks (of physical address, color and whether main entry) are executed any more for this detour step. Variant (b): The reference is not read from $c_i$ but from $d_{r}$.)
4. If a main entry was read out in step 2, i.e., $main_i$, but the physical address does not match ($r_i \neq \dot{r}$ or $c_i \neq \dot{c}$) and if it is a badly-colored access ($\ddot{c} \neq \dot{c}$) a color correction is tried (FIG. 4): $\ddot{c}$ is loaded with the physical color $\dot{c}$ and another step 2 is executed.
5. In any other case, cache access is aborted and a miss is signaled.

The above operation may be applied correspondingly to a multi-way set-associative (n-way set-associative) cache. In the case of an n-way set-associative cache, n entries are selected simultaneously. The individual entries are distinguished in the following description by the additional index j, e.g. $c_{i,j}$.

In the following, the preconditions for the operations described on the right are listed left to→. For selecting an alternative, all conditions listed have to be fulfilled (logic AND-operation). All operations separated by comma are executed in parallel. Overline (as $\overline{step2}$) denotes the negation of a signal and/or a bit and "!" (as step2!) denotes the setting of a signal and/or a bit. A signal and/or a bit is reset by "!" applied to the negated signal (as $\overline{step2}$!). D denotes the data bus.

For all j from 1 to n, the following is executed in parallel:

$$\left\{\ddot{r}=r_{i,j}\left\{\begin{array}{l}main_{i,j}, \ddot{c}=c_{i,j} \rightarrow \left[\begin{array}{l}d_{i,j} \leftrightarrow D(\text{read})\\ D \leftrightarrow d_{i,j}(\text{write})\end{array}\right], \text{hit}!(*)\\ \overline{main_{i,j}}, \ddot{c}=\ddot{c} \rightarrow [c_{i,j} \leftrightarrow \ddot{c}], \text{step2}!(***)\end{array}\right.\right.$$

Combining all n blocks, the following is executed:

$$\left\{\begin{array}{l}\text{hit} \rightarrow \square()\\ \overline{\text{hit}}, \overline{\text{step2}} \left\{\begin{array}{l}\ddot{c}=\dot{c} \rightarrow \square()\\ \ddot{c} \neq \dot{c} \rightarrow [\ddot{c} \leftrightarrow \dot{c}](***)\end{array}\right.\end{array}\right.$$

In this case □ denotes the termination of the cache operation, resulting either in a hit (hit) or a miss ($\overline{\text{hit}}$). If no alternative is selected terminating with □, work will be continued in the next cycle by following the same procedure.

Should a "hit" be signaled in the n-way set-associative cache during the first cycle for an entry of a way in the step described before under B, one will reach the point marked "(★)" in the above diagram A after the first step. Subsequently, the first line in diagram B is followed and the cache access is terminated (successfully) at the point marked "(★★)". Thus, the main entry was hit the first time the cache memory was addressed.

However, if a reference entry (see above under step 3) is found upon addressing the cache memory for the first time, one will reach the point marked "(★★★)" after the first cycle and will continue again with diagram A for all ways of the cache memory. Should the hit signal still not be set after the cache memory has been addressed anew according to the above described diagram A, the cache access will be aborted.

In case both the hit signal and the signal step2 are not set after addressing the cache memory according to the above method A, the cache access will be aborted with a miss, if the index color matches the physical color (see the point marked "(★★★★)"). However, should the index color and the physical color not match, a color correction is executed (see "(★★★★★)" in the bottom line of diagram B). Thereafter, the access is executed again with the start of diagram A.

For reasons of clarity, only reading and writing whole cache entries has been described. Considering low-order address bits, only parts of an entry can of course also be read or written by using the usual and well-known procedures. Impacts on the control logic of the badly-colorable cache described herein do not occur.

It is an extension of the cache described above to admit also badly-colored reference entries and several reference entries per main entry. At least one entry among the reference entries will then keep a list of all related entries in its data field (which is not required for data in the case of a reference entry).

Alternatively or additionally, also a reference entry can contain the data so that, upon reading, they may be delivered directly without the detour step. With read accesses, either the respective other entry must also be updated or its data field must be marked as invalid.

Figure 5:
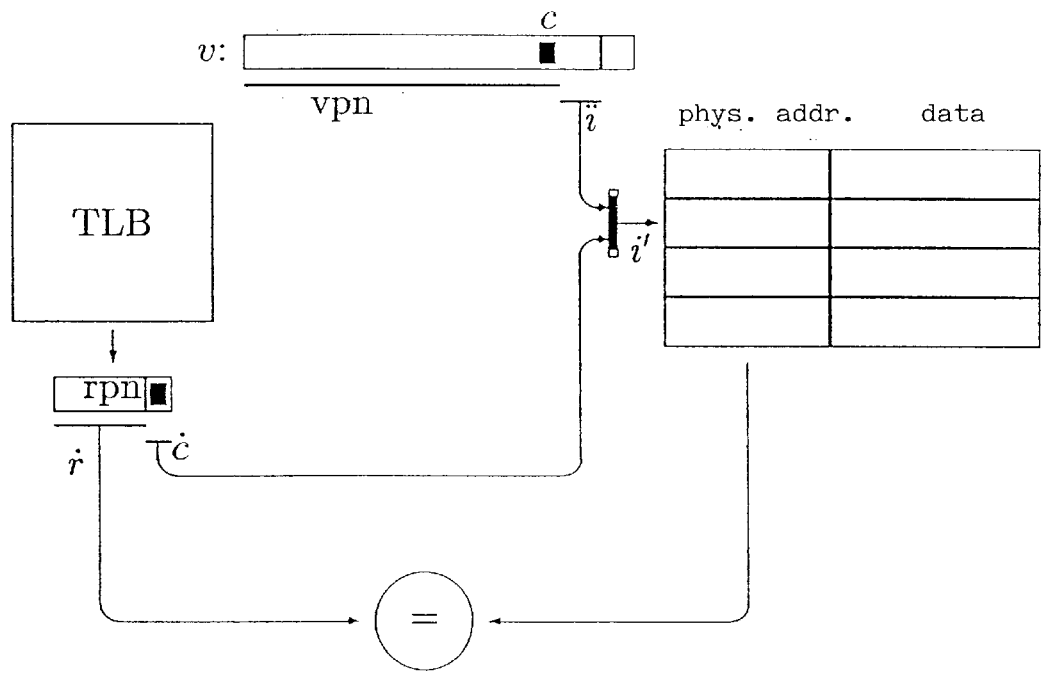
Figure 6:
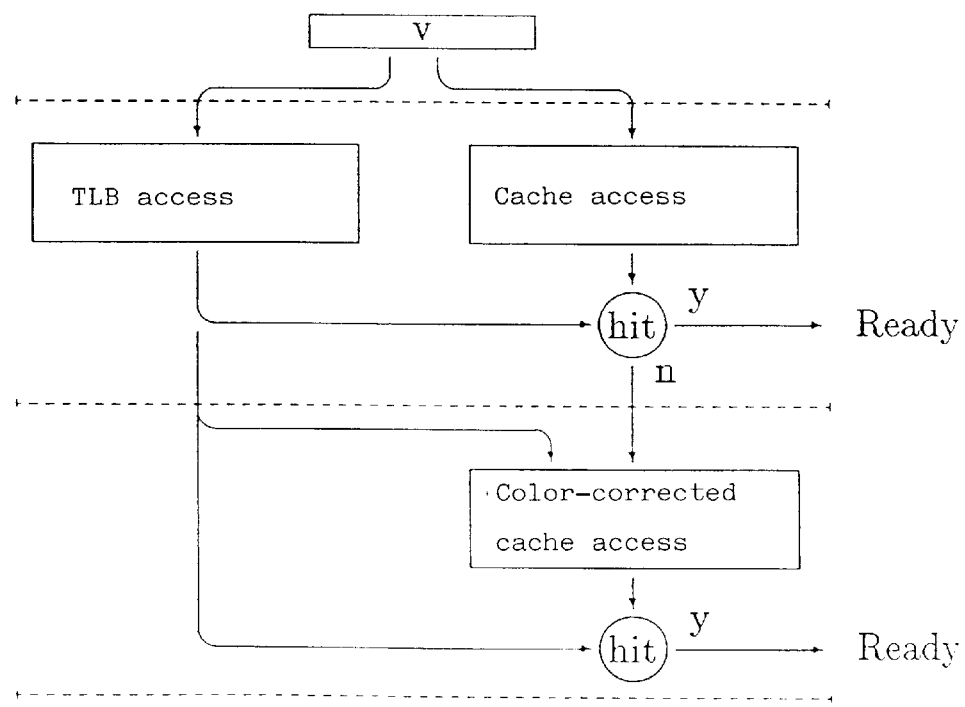
Figure 7:
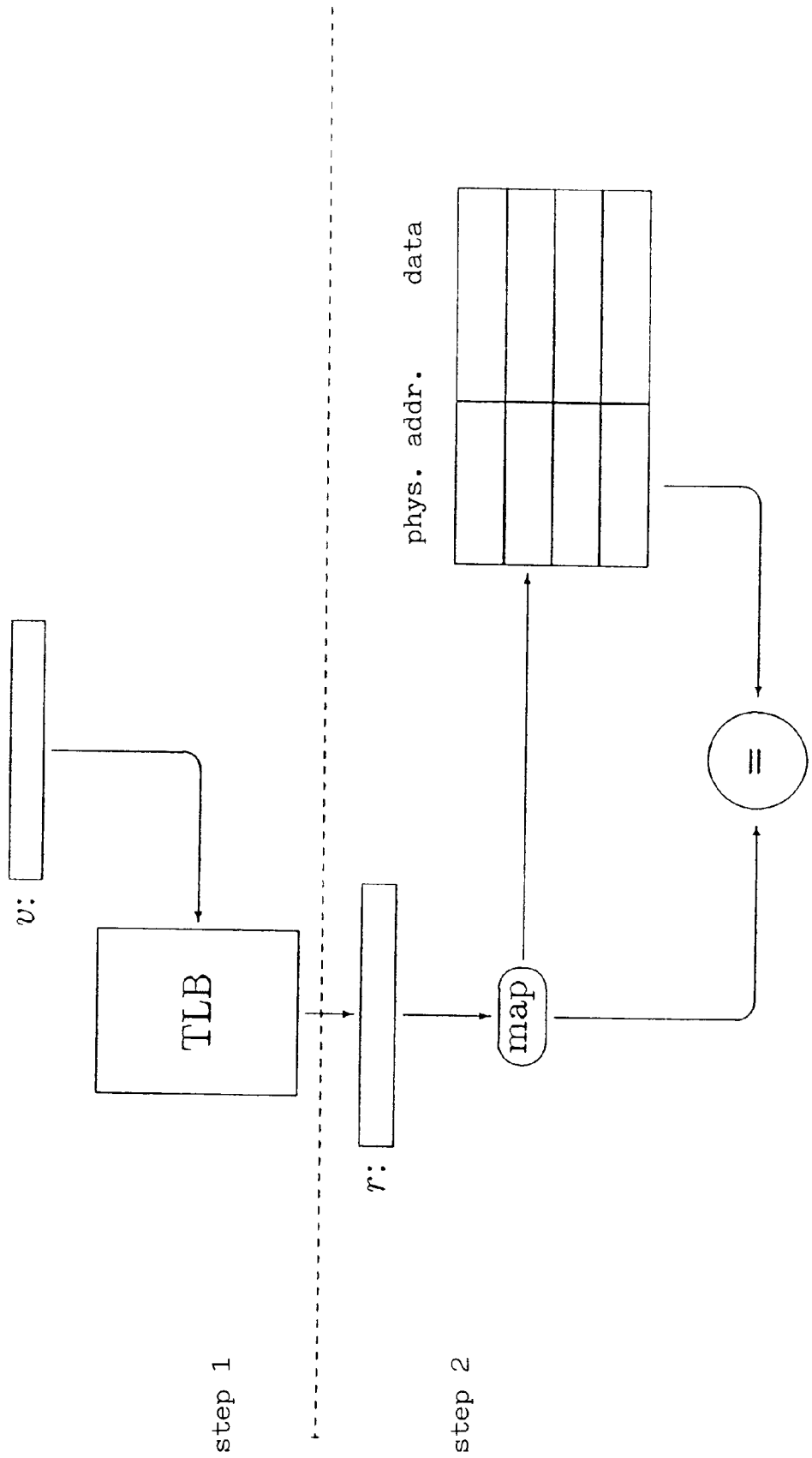
Figure 8:
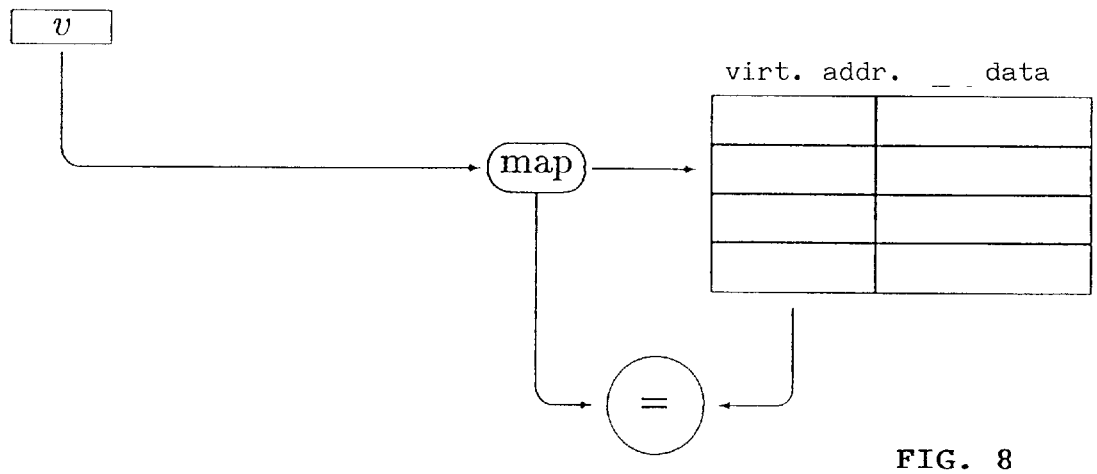
Figure 9:
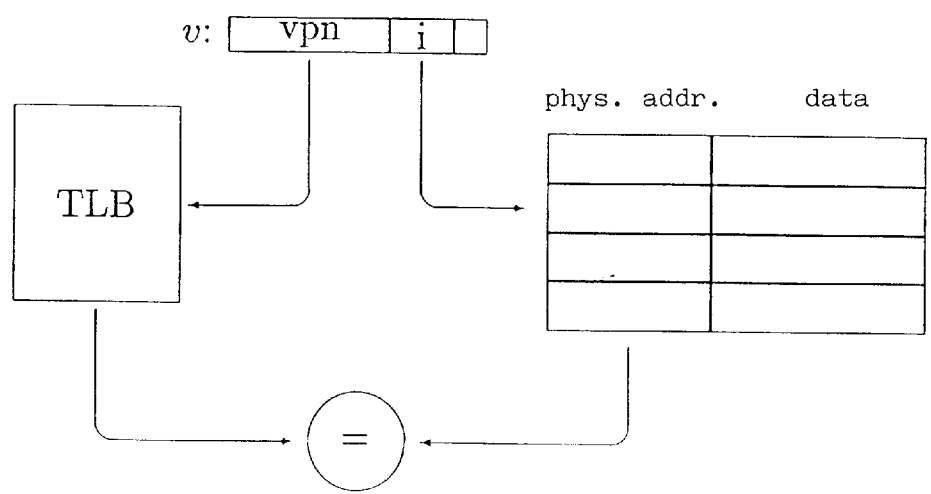
Figure 10:
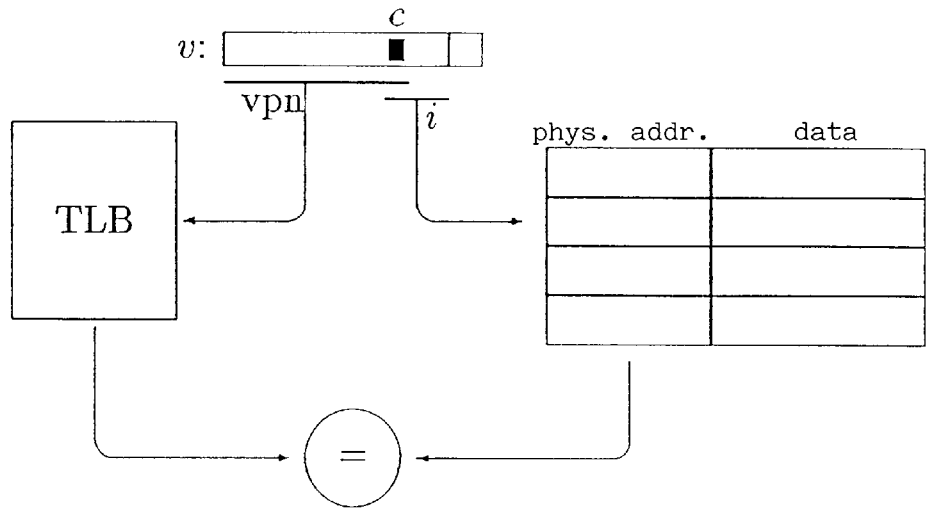
Figure 11:
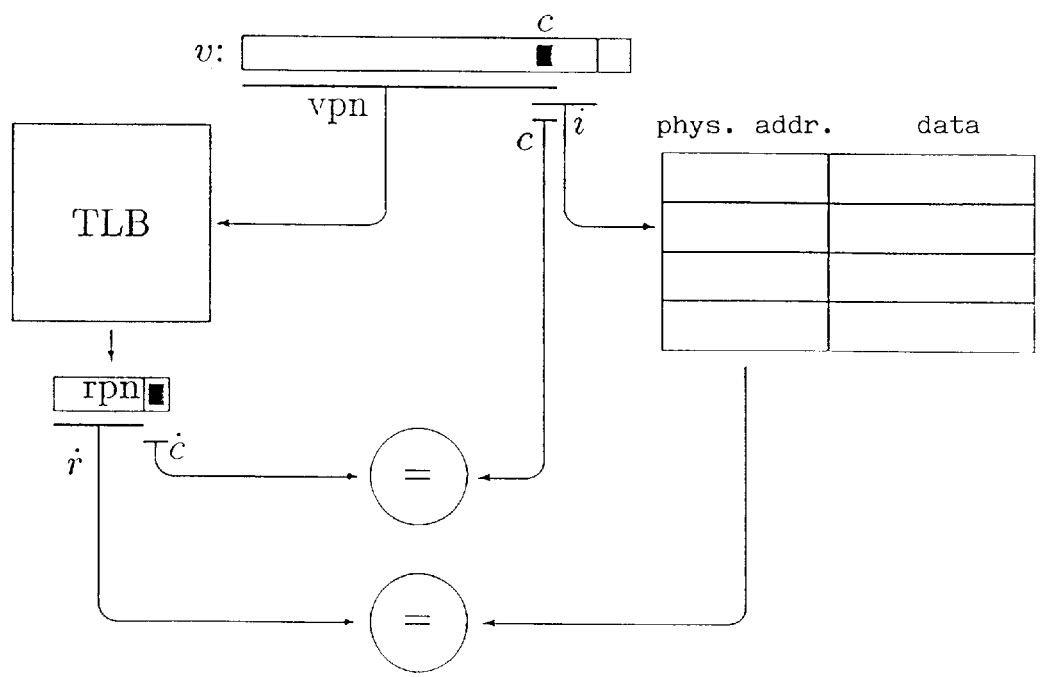

The above page coloring method for cache addressing is of course meant to function even when the allocation is not perfectly well-colored. According to the invention, a color-corrected cache access (see FIG. 5) will be attempted in case the first cache access using the cache index portion and the group information of the virtual address has led to a cache miss and the physical color c' supplied by the TLB differs from the virtual color c. The new (color corrected) cache indexing is executed using the cache index portion of the virtual address and the group information $\dot{c}$ associated with the physical address. Badly-colored pages can thus be used, yet they require an additional step when accessing the cache (see FIG. 6).

Under certain circumstances, a badly-colored allocation is imperative, e.g. when two virtual pages of different colors have to be mapped onto the same physical page. Thus, badly-colored page allocations that have to be processed by the cache memory can always occur.

According to a first variant, when addressing a cache, the cache memory is first indexed using the cache index portion and the group information of the virtual address and one cache entry is addressed per way of the cache memory. The tags of all cache entries now addressed are read out to check whether they match with the residual physical address portion of the physical page number of the physical address translated from the virtual address. Further, the group information of the virtual address is compared to the group information of the physical address. If these two group information are identical, it is checked which of the tags of the addressed cache entries matches the residual physical address portion of the physical address translated from the virtual address, there being a cache hit for the cache entry having a tag matching the residual physical address portion, so that the cache address operation is terminated and data may be written into or read from the data field of this cache entry. Should no addressed cache entry exist having a tag matching the residual physical address portion, the cache address operation is terminated and a cache miss is given. However, if the two group information differ (which is determined by the above comparison), the cache memory is indexed using the cache index portion of the virtual address and the group information of the physical address. Now, it is checked which of the tags of the cache entries now addressed matches the residual physical address portion of the physical address translated from the virtual address, there being a cache hit for the cache entry having a tag matching the residual physical address portion, so that the cache address operation is terminated and data may be written into or read from the data field of this cache entry. Should, once more, no addressed cache entry exist having a tag matching the residual physical address portion, the cache address operation is terminated and a cache miss is given.

In the second alternative of the cache access with the possibility of a color-corrected cache index it is first attempted (without a color correction) to address the cache using the cache index portion and the group information of the virtual address, one cache entry being addressed per way of the cache memory. The tags of all cache entries now addressed are read out to check whether they match with the residual physical address portion of the physical page number of the physical address translated from the virtual address. Further, the group information of all cache entries presently addressed are read out to be checked for correspondence to the group information of the physical address translated from the virtual address. Then, it is checked which of the cache entries has a tag matching the residual physical address portion of the physical address translated from the virtual address and group information matching the group information of the physical address, there being a cache hit for this cache entry and the cache address operation is terminated and data may be written into or read from the data field of this cache entry. Should no cache entry exist having a tag matching the residual physical address portion and group information matching the group information of the physical address, the group information of the virtual address is compared to the group information of the physical address. Should both group information be in correspondence, the cache address operation is terminated and there is a cache miss. However, if the two group information differ, the cache memory is indexed again using the cache index portion of the virtual address and the group information of the physical address. Now, the tags and the group information of all cache entries now addressed matches are read out to be checked for correspondence to the residual physical address portion and/or the group information of the physical address. Thereafter, it is again checked which of the addressed cache entries has a tag matching the physical address translated from the virtual address and group information matching the group information of the physical address, there being a cache hit for this cache entry, so that the cache address operation is terminated and data may be written into or read from the data field of this cache entry. Should, once more, no cache entry exist having a tag matching the residual physical address portion and group information matching the group information of the physical address, the cache address operation is terminated and a cache miss is given.

I claim:

1. A cache memory device for storing data, comprising a one- or multi-way set-associative cache memory that may be indexed by a virtual address comprising a cache index portion and a page number address portion representing a virtual page number and having group information indicating one of a plurality of groups to which the virtual page represented by the page number address portion of the virtual address belongs, the virtual address being translatable into a physical address with a page number address portion representing a physical page number comprising group information and a residual physical address portion, the group information indicating one of a plurality of groups to which the physical page represented by the page number address portion of the physical address belongs, and the cache memory having a plurality of cache entries indexable by the cache index portion and the group information of the virtual address, each of the cache entries having at least one tag, one group information, one settable and resettable state flag and at least one data field, a cache addressing being attempted with the following steps:

a) the cache memory is indexed using the cache index portion and the group information of the virtual address, one cache entry being addressed per way of the cache memory, b) the tags of all cache entries now addressed are read out to be checked for correspondence to the residual physical address portion of the physical page number of the physical address translated from the virtual address, c) the group information of all cache entries now addressed are read out to be checked for correspondence to the group information of the physical address translated from the virtual address, d) it is checked which of the cache entries read out in the steps b) and c) has a set state flag, e) if there is a cache entry in step d) having a set state flag and a tag matching the residual physical address portion of the physical address and group information matching the group information, there is a cache hit and the cache address operation is terminated, it being possible for data to be written into and read out from the data field of the respective cache entry, otherwise f) it is determined whether the group information of the virtual address is identical to the group information of the physical address and whether one of the addressed cache entries has a tag matching the residual physical address portion of the physical page number and a state flag not set, g) if, in step f), the conditions for a cache entry are given, the cache memory is indexed using the cache index portion and the group information of this cache entry, one cache entry being addressed per way of the cache memory, and the steps b), c) and d) are executed, h) a cache hit is given for the cache entry among those now addressed that has a set state flag and a tag matching the residual physical address portion of the physical address and group information matching the group information of the physical address, the cache address operation being terminated and it being possible for data to be written into and read out from the data field of the respective cache entry, i) if at least one of the conditions in step f) is not given, it is checked whether the group information of the virtual address differs from the group information of the physical address, j) if the condition in step i) is given, the cache memory is indexed using the cache index portion and the group information of the physical address, one cache entry being addressed per way of the cache memory, and the steps b) to h) are executed, the cache address operation being terminated and a cache miss being given, if a step f) is executed in the process and at least one of the conditions of step f) is not fulfilled, k) if the condition in step i) is not fulfilled or if no cache hit is given in step h), the cache address operation is terminated and there is a cache miss.

2. The cache memory device of claim 1, wherein in the case of a direct mapped cache memory with a single way, checking of the state flag, the tag and the group information of the single addressed cache entry is omitted in step h) and there is a cache hit for this single addressed cache entry.

3. A cache memory device for storing data, comprising a one- or multi-way set-associative cache memory that may be indexed by a virtual address comprising a cache index portion and a page number address portion representing a virtual page number and having group information indicating one of a plurality of groups to which the virtual page represented by the page number address portion of the virtual address belongs, the virtual address being translatable into a physical address with a page number address portion representing a physical page number comprising group information and a residual physical address portion, the group information indicating one of a plurality of groups to which the physical page represented by the page number address portion of the physical address belongs, and the cache memory having a plurality of cache entries indexable by the cache index portion and the group information of the virtual address, each of the cache entries having at least one tag, one group information, and at least one data field, a cache addressing being attempted with the following steps:

a) the cache memory is indexed using the cache index portion and the group information of the virtual address, one cache entry being addressed per way of the cache memory, b) the tags of all cache entries now addressed are read out to be checked for correspondence to the residual physical address portion of the physical page number of the physical address translated from the virtual address, c) the group information of the virtual address are compared to the group information of the physical address, d) if, in step c), both group information are identical, it is checked which of the tags of the addressed cache entries matches the residual physical address portion of the physical address, there is a cache hit for the cache entry with the tag matching the residual physical address portion, so that the cache address operation is terminated and data can be written into and read out from the data field of the respective cache entry, e) if there is no match in step d), the cache address operation is terminated and there is a cache miss, f) if, in step c), both group information differ, the cache memory is indexed, using the cache index portion of the virtual address and the group information of the physical address, g) it is checked, which of the tags of the addressed cache entries matches the residual physical address portion of the physical address translated from the virtual address, there being a cache hit for the cache entry with the tag matching the residual physical address portion, so that the cache address operation is terminated and data can be written into and read out from the data field of the respective cache entry, h) if, again, there is no match in step g), the cache address operation is terminated and there is a cache miss.

4. A cache memory device for storing data, comprising a one- or multi-way set-associative cache memory that may be indexed by a virtual address comprising a cache index portion and a page number address portion representing a virtual page number and having group information indicating one of a plurality of groups to which the virtual page represented by the page number address portion of the virtual address belongs, the virtual address being translatable into a physical address with a page number address portion representing a physical page number comprising group information and a residual physical address portion, the group information indicating one of a plurality of groups to which the physical page represented by the page number address portion of the physical address belongs, and the cache memory having a plurality of cache entries indexable by the cache index portion and the group information of the virtual address, each of the cache entries having at least one tag, one group information, and at least one data field, a cache addressing being attempted with the following steps:

a) the cache memory is indexed using the cache index portion and the group information of the virtual address, one cache entry being addressed per way of the cache memory, b) the tags of all cache entries now addressed are read out to be checked for correspondence to the residual physical address portion of the physical page number of the physical address translated from the virtual address, c) the group information of all cache entries now addressed are read out to be checked for correspondence to the group information of the physical address translated from the virtual address, d) it is checked, which of the addressed cache entries has a tag matching the residual physical address portion of the physical page number of the physical address translated from the virtual address and group information matching the group information of the physical address, there being a cache hit for this cache entry, so that the cache address operation is terminated and data can be written into and read out from the data field of the respective cache entry, e) if, in step d), there is no match, the group information of the virtual address is compared to the group information of the physical address, f) if both group information match, the cache address operation is terminated and there is a cache miss, g) if both group information differ, the cache memory is indexed again, using the cache index portion of the virtual address and the group information of the physical address, h) a step d) is executed for the cache memory indexed according to step g), i) if, again, there is no match in step d) executed in accordance with step h), the cache address operation is terminated and there is a cache miss.

* * * * *